United States Patent [19]
Roxby et al.

[11] Patent Number: 5,619,029
[45] Date of Patent: Apr. 8, 1997

[54] IMAGING ENHANCEMENT FOR TOUCH CAMERAS

[75] Inventors: Donald L. Roxby; Lisa M. Johnson, both of Huntsville, Ala.

[73] Assignee: Rockwell International Corporation, Seal Beach, Calif.

[21] Appl. No.: 416,241

[22] Filed: Apr. 4, 1995

[51] Int. Cl.[6] .................................................. G06K 7/10
[52] U.S. Cl. ................................. 235/472; 235/469
[58] Field of Search .................................... 235/462, 465, 235/469, 472

[56] References Cited

U.S. PATENT DOCUMENTS

| 3,662,181 | 5/1972 | Hercher et al. | 235/465 |
|---|---|---|---|
| 3,800,282 | 3/1974 | Acker. | |
| 3,801,775 | 4/1974 | Acker. | |
| 4,158,194 | 6/1979 | McWaters et al. | 235/454 |
| 4,488,679 | 12/1984 | Bockholt | 235/469 |
| 5,198,650 | 3/1993 | Wike, Jr. | 235/472 |
| 5,291,008 | 3/1994 | Havens et al. | 235/462 |
| 5,313,373 | 5/1994 | Bjorner et al. | 362/19 |
| 5,354,977 | 10/1994 | Roustaei | 235/472 |
| 5,408,084 | 4/1995 | Brandorff et al. | 250/208 |
| 5,428,212 | 6/1995 | Tani et al. | 235/472 |
| 5,434,403 | 7/1995 | Amir et al. | 235/472 |
| 5,449,892 | 9/1995 | Yamada | 235/462 |
| 5,484,994 | 1/1996 | Roustaei | 235/462 |

Primary Examiner—Harold Pitts
Attorney, Agent, or Firm—Harry B. Field; Lawrence N. Ginsberg

[57] ABSTRACT

The present invention relates to a method and an apparatus for enhancing the optical image of information-containing symbols captured off highly reflective surfaces using a conventional optical touch camera. The method involves positioning the imaging assembly of the touch camera atop an information-containing coded symbol located on a component surface, positioning a diffuser element between the coded symbol and the imaging assembly, and moving the diffuser element into juxtaposition with the coded symbol before imaging the coded element.

21 Claims, 1 Drawing Sheet

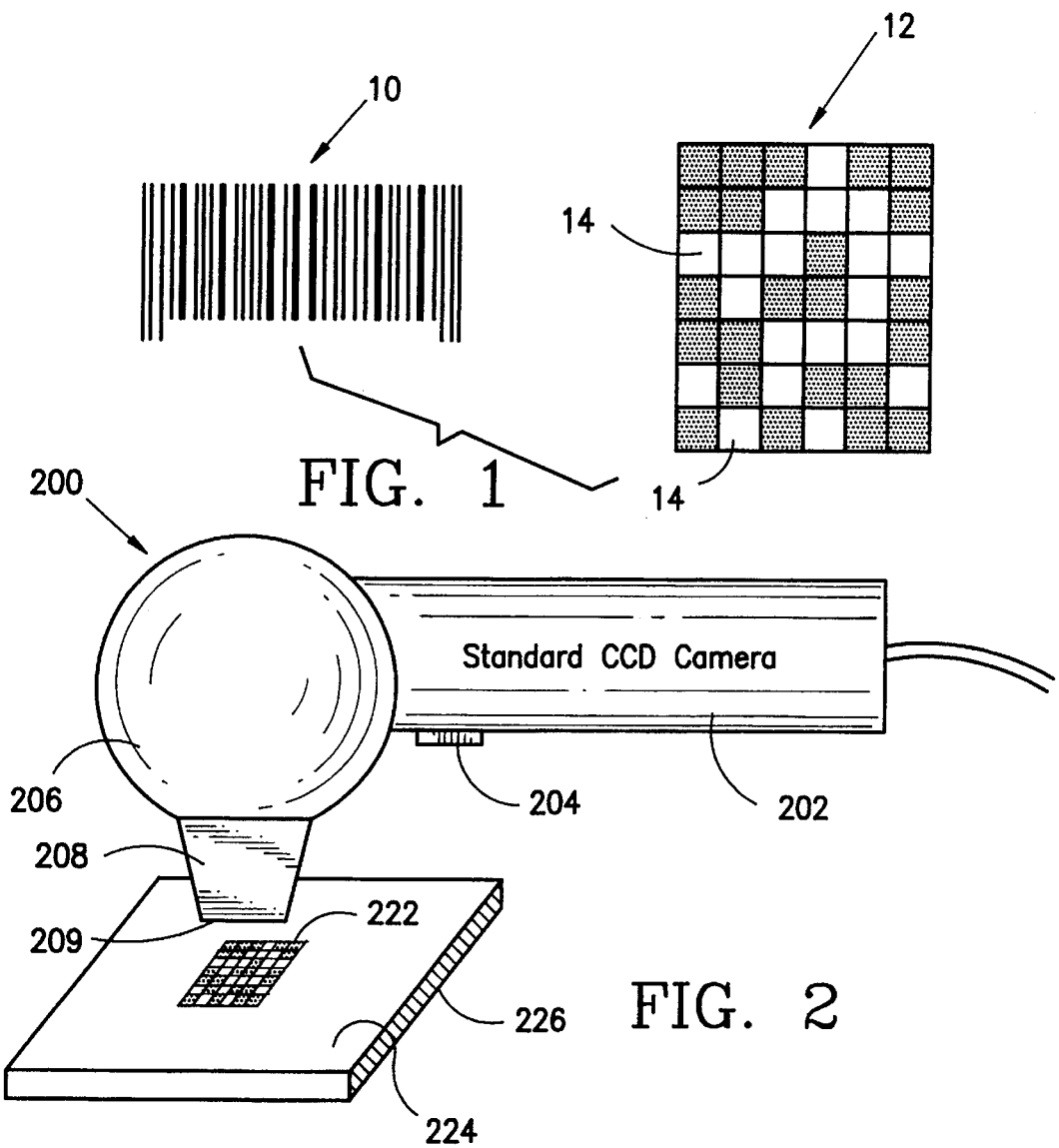
FIG. 1
FIG. 2
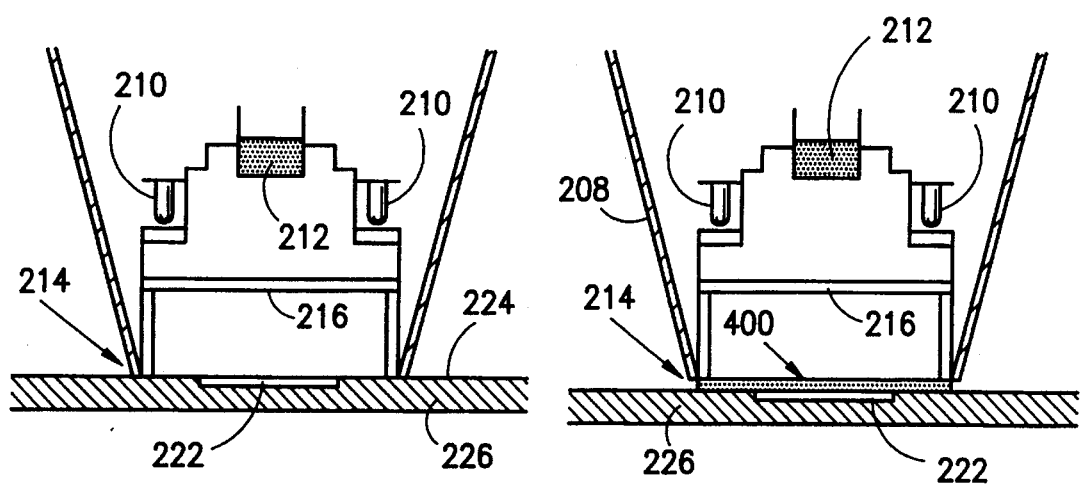
FIG. 3
(PRIOR ART)
FIG. 4

IMAGING ENHANCEMENT FOR TOUCH CAMERAS

BACKGROUND OF THE INVENTION

1. Field of the Invention

The present invention relates to touch cameras used in imaging and decoding information-containing symbols, and more particularly, to an improved method and apparatus for capturing machine-readable bar and matrix code symbols from various surfaces, including highly reflective, textured, or curved surfaces.

2. Description of the Related Art

Many industries, including those involving component assembly, processing, or inventorying, use an identification system in which the products are marked with a coded symbol containing information about the products, such as bar code or matrix symbols.

A number of different readers and laser scanning devices have been developed to decode the symbol pattern to a multiple numeric or alpha/numeric representation. These "optical scanners" are available in a variety of configurations, and are either incorporated into fixed station apparatus or portable apparatus.

The portability of an optical scanner enhances the ability to inventory products on shelves and to track portable items such as files or small equipment. A number of these portable scanning devices incorporate laser diodes, which allow the user to scan the coded symbols at various distances from the surface on which the coded symbol is located. The principal disadvantage of such scanners is that they are unable to read coded symbols which have been placed on highly reflective, textured, or patterned surfaces. A second disadvantage of such scanners is their high cost of manufacture.

Another type of coded symbol scanner, which is embodied in a portable apparatus, uses light emitting diodes (LEDs) as a light source and a charged coupled device (CCD) as a detector. This class of coded symbol scanners is generally known as CCD scanners. While they have the advantage of being less expensive to manufacture, they also require that the scanner be in contact with the surface on which the symbol is located.

However, the imaging capabilities of such cameras, known as "touch or contact" cameras, are typically adversely affected by specular reflection emitted from highly reflective, smooth surfaces, or shadowing produced by minor surface defects, and patterns or surface textures produced by machining.

The solid state image sensor used in CCD touch cameras is a matrix array of light sensitive monolithic silicon chips ("pixels") which absorb photons. A typical 512×512 matrix sensor array contains 262,144 chips. During operation, the solid-state image sensor converts incident light to electric charge which is integrated and stored until the time of readout. The integrated charge is directly proportional to the intensity of the light on the sensing elements. Readout is initiated by a periodic start or transfer pulse. The charge information is then sequentially read out at a rate determined by clock pulses applied to the image sensor. The output is a discrete time analog representation of the spatial distribution of light intensity across the array.

The primary disadvantage of using CCD cameras in imaging ("capturing") machine-readable symbols is a phenomenon known as "blooming", a condition which can severely degrade the performance of the image sensor and can cause problems with the camera circuitry. Blooming occurs when an excessive number of light generating electrons are produced. The result is that bright parts of the image smear and spread out into the surrounding darker areas of the image creating false responses from the pixels in those areas. The effect appears similar to the petals of a flower blooming out from a bud; hence, the name "blooming". Often "blooming" occurs as an unavoidable anomaly to normally expected conditions, such as specular reflections or other transient high intensity light.

The total charge in any given pixel is the result of photon absorption which creates electrons that accumulate over the integration period; thus, the total photo-electron generation ("photocurrent"). The brighter the light intensity, the higher the photocurrent. Excessive charge can be created by either excessive illumination or too lengthy an integration time. The excessive charge cannot be completely discharged within the average time a human can hold such cameras still (normally $\frac{1}{60}$ second), so it leaks past the transfer gate of the CCD and appears as a vertical stripe on a video monitor. An even greater intensity light produces a charge that not only leaks past the transfer gate, but also past the channel stoppers of the other pictures, thus causing a washout area in the video image. This condition is technically known as depth overflow.

These problems can be overcome in most fixed station camera applications by controlling the external lighting conditions using special equipment, as for example, portable studio lights, filters and reflectors. This equipment, however, is not practical for use in the field where lighting conditions change on a continual basis.

To overcome the specular reflection problem, field use cameras are best operated in the "touch" mode, where the optical windows of the cameras are pressed against a substrate's surface atop the coded symbol to be imaged in order to block out all incident light. The surface is then illuminated with a built-in light source which emits light having an optimum intensity, angle and wavelength. Cameras of this type are extremely effective for imaging high quality paper labels applied to flat surfaces, but they are ineffective for acquiring images from rough or reflective materials or curved surfaces.

Symbol reading cameras which are known are disclosed in the U.S. Pat. Nos. to Beyor (U.S. Pat. No. 4,742,220), August (U.S. Pat. No. 3,961,198), Katana et al. (U.S. Pat. No. 4,743,773), Hara et al. (U.S. Pat. No. 4,818,847), Swartz (U.S. Pat. No. 4,825,057), Matusima et al. (U.S. Pat. No. 4,900,907), Baumberger (U.S. Pat. No. 4,908,500), Dolash (U.S. Pat. No. 4,983,817), Roustaei (U.S. Pat. Nos. 5,291,009 and 5,354,977), and Powell et al. (U.S. Pat. No. 5,350,909).

None of these cameras, however, are effective in a "touch" mode to permit symbol capture from roughened, highly reflective, or curved surfaces.

OBJECTS AND SUMMARY OF THE INVENTION

A principal object of the present invention, therefore, is to provide an improved method and apparatus for optically imaging, by touch-mode cameras, information-containing encoded symbols which have been placed on highly reflective, patterned, or curved substrates, while overcoming many of the drawbacks and disadvantages of known similar methods and apparatus.

Another object of the present invention is to provide an improved method and apparatus for optically imaging matrix or bar code symbols located on highly reflective, textured, or curved surfaces, using a touch optical scanning camera apparatus with an illuminating assembly including means for softening the light projected onto, as well reflected from, the symbol and surface.

These and other objects are accomplished through the use of a diffuser positioned at the camera's imaging window through which the symbol-illuminating light passes. The diffuser breaks up and scatters, and thereby softens, direct, hard, LED light emitted from within the camera onto the target symbol and then reflected back to the camera.

Other objects, advantages, and novel features of the present invention will become apparent from the following detailed description of the invention when considered in conjunction with the accompanying drawings.

BRIEF DESCRIPTION OF THE DRAWINGS

FIG. 1 shows the basic elements of conventional bar code and matrix code symbols;

FIG. 2 is a schematic diagram of the camera apparatus of the present invention disposed in a position over a coded symbol for imaging the symbol;

FIG. 3 is an enlarged sectional view of the enshrouded optical viewing region of a typical touch camera apparatus currently known;

FIG. 4 is an enlarged sectional view of the enshrouded optical viewing region of a touch camera apparatus in accordance with the present invention.

DETAILED DESCRIPTION OF THE PREFERRED EMBODIMENTS

A conventional bar code symbol 10 is shown in FIG. 1. The symbol consists of a running sequence of different width bars and spaces arranged in a linear array. This sequence of bars and spaces, as well as the thicknesses of the bars, correlates to dots and dashes of Morse code, and software packages used to decipher these codes are based on this principle. Bar codes are generally recognized as an efficient method of entering data into a database.

Also shown in FIG. 1 is a typical matrix symbol 12. All data in a matrix symbol is represented by a sequence of equal size units, i.e., data cells 14. Each sequence of data cells can include any combination of black cells (which are typically used to represent a binary "1") and white cells (which are typically used to represent a binary "0"). When arranged together in specific sequences, a variety of alpha/numeric characters can be represented. The equal size and binary valuation of data cells enable ease of decoding in a logic decision process. Moreover, matrix codes are decodable from any direction or orientation, i.e., left, right, top or bottom.

One example of a matrix symbol and its manner of use, which is well-known in the art, is the Vericode® symbol. This symbol is disclosed, described, and claimed in U.S. Pat. Nos. 4,924,078 and 4,972,475.

FIG. 2 illustrates camera apparatus 200 of the type typically used by the present invention which is positioned atop a coded symbol on a substrate for imaging a coded information-containing symbol (shown here as a matrix symbol). The symbol, typically applied to a surface of a component, is produced by a code generation software package, preferably embodied within a computer. Such computers can be of the desk-top class or they can be contained within the scanner itself.

Information which can be included in a coded symbol encompasses such items as a description of the product or component, place of manufacture, last repair or last service, current location, destination, owner, current date, date on which it is to be shipped, the cargo carrier or container into which it is scheduled to be placed, etc.

The output of code generation software packages is a sequence of numeric and alpha/numeric data values which are converted to cell representations in the information-containing symbol.

Preferably, a marking device driver software package is coupled to the computer to interface with the code generation software package. Methods and apparatus for marking information-containing symbols onto substrate materials have been described in applicants' co-pending patent application U.S. Ser. No. 08/164,492, filed on Dec. 8, 1993, the subject matter of which is incorporated herein by reference.

Referring again to FIG. 2, the camera apparatus 200 is disposed in an imaging position over an information-containing symbol 222 (shown here as a matrix symbol) located on a surface 224 of component 226. The machine readable symbol is "captured" using a CCD optical camera 202 (which can be configured for fixed or portable application), having a trigger 204 and a pivotable head 206. The head houses the camera's optical assembly and supports a shroud 208 having a narrow base 209 for defining an imaging window for the camera's lens, as explained below in greater detail.

FIG. 3 illustrates the viewing portion of a camera apparatus typically used in the imaging of bar and matrix code symbols, while FIG. 4 shows the viewing portion of a camera apparatus as contemplated by the present invention. Similar parts in these two figures are represented by the same or similar reference numerals (e.g., by primed reference numerals).

As seen in FIG. 3, the shroud 208 houses an LED array 210 and a lens unit 212. The shroud presents an inverted trapezoid in section and includes a larger annulus at the end secured to the camera and a smaller annulus at the other end at which is located a viewing window 214. The lens unit 212 is preferably situated at the center of the LED array. The LED array is provided for illuminating the symbol 222 located on substrate 226, when the viewing window is located atop the symbol. Lighting of the symbol, as well as operation of the camera's shutter mechanism, is activated by depressing the trigger 204 on the camera.

A plastic or glass dust cover 216 is preferably located between the lens unit 212 and the viewing window 214, and most preferably at the viewing window (although it is shown recessed from window 214 in FIGS. 3 and 4). Where the dust cover 216 is not provided at all, the inner cylindrical surface adjacent window 214 is preferably provided with a reflective coating.

Images of symbols are "captured" with a CCD camera by triggering the camera to freeze a single frame of a continuous analog video signal stream (RS-170), and converting the single frame image to a digital signal (RS-232) to create a digital representation of the image, i.e., as a series of ones and zeros. The digital data stream is then electronically compared against a look-up table to translate the binary-coded data back into human readable, alpha/numeric characters.

Portable cameras are useful for field applications, while fixed station cameras are useful for capturing symbols from a distance. Fixed station cameras generally are used in combination with one or more external adjustable lighting units having specialized applications or accessories, such as additive lighting and subtractive lighting. Additive lighting involves the use of artificial lights or reflectors increase light to the optical area of interest to be imaged. Subtractive lighting uses screens or diffusers to remove or lower the light intensity of the optical area of interest.

In addition, fixed station cameras generally have manual adjustment capabilities to enhance depth of field, light input and focus. Portable cameras are equipped with built-in lighting capabilities which project visible light onto the symbol.

Fixed focus cameras are provided with shrouded windows (which typically are either open or covered with glass) that must be applied directly over the symbol to enable symbol capture while also blocking out external light that can strike the symbol at an angle and produce glare.

Built-in lighting is used in a portable touch camera and is provided by light emitting diodes (LEDs). LEDs are used because of their high reliability, durability, long life (typically 100,000 hours or more), low power requirements and excellent mechanical, thermal and optical stability.

However, LEDs emit a harsh, hard light composed of focused, direct, parallel rays which originate from a comparatively small or "point" light source.

While LED light provides excellent contrast between the bright and shadowed areas of the image, the detailed contrast hinders data capture operations because it accentuates surface flaws which are perceived by the decoding software to be a part of the symbol.

The hard light also produces glare when projected onto reflective surfaces. As a result, this type of camera is restricted to applications where surface finishes and background color are rigidly controlled, as for example on printed labels or tags, and surfaces covered with flat or matte coatings.

As shown in FIG. 4, the present invention overcomes these difficulties by placing a diffuser element 400 atop the symbol and between the camera viewing window (and lens) and the symbol to be optically imaged.

The diffuser element 400, when positioned atop a symbol on a reflective or rough surface, acts to scatter the harsh light rays emitted from the camera LEDs. When the LED light is directed toward the diffuser element located at the end of the camera housing, it passes through the upper surface of the diffuser element where it is diverted in various directions into the medium of the diffuser element. The scattered light moves through the diffuser element to the opposite lower surface. This lower diffuser surface, positioned atop the symbol on the substrate surface, causes the light to be reflected back through the diffuser element material toward the camera lens, and in the process, the light is scattered even more through the diffuser element so that it is seen by the lens as soft light. Therefore, by using the diffuser element in the manner shown, no harsh light is projected directly onto, or returned from the imaged symbol, located on the substrate surface.

Preferably, the diffuser plate of the present invention, as shown in the figures, is fabricated from a plastic material, and most preferably from a polyester plastic film.

The diffuser element shown in the figures is preferably mounted on the camera at the imaging window of the camera housing, as for example by bonding the element onto a rigid mounting frame which is attached directly to the camera head, or by bonding a film or thin layer of the material directly over the glass or other optical material which covers the imaging window. Since the image quality drops rapidly as the gap between the diffuser and the surface on which the symbol is located increases, the optimum results are achieved in using the touch camera of the present invention by directly pressing or otherwise positioning the diffuser element against or in contact with the symbol.

One material used by the inventors for the diffuser plate, which provided excellent results, was a ¼ white, tough plastic, diffusing film, identified as Number 118 Tough ¼ White Polyester Plastic Diffusing Film, 0.002" thick. This material is currently obtainable from Rosco Laboratories, 36 Bush Avenue, Port Chester, N.Y. 10573. The diffusing film was bonded to a rigid mounting plate which was attached directly to the camera head, as for example, by a threaded or bayonet connection. Alternatively, the diffuser element may comprise a thin coating on a piece of plastic or glass which covers the camera viewing window, or it can be a thick, but flexible, piece of the film material so that even with a substrate having a concave surface, the diffuser element can still be firmly pressed against the surface of the substrate.

The image-capturing method of the present invention involves pressing the head of a hand-held or fixed station optical imaging CCD camera into contact with the component surface in the vicinity of the symbol to be captured by the camera. Proper placement of the camera head over the symbol is evident when the symbol image is centered on a video monitor which forms a part of the imaging camera. At that time, the operator can depress a trigger located on the camera to instantaneously capture a symbol image. The analog image is then converted to a train of digital signals which are processed via a decoder software package (see assignee's co-pending application referred to above). The software is provided to facilitate decoding of the data contained in the symbol, and may either be installed in the portable unit, or provided with a desktop or laptop computer processor and monitor apparatus with which the imaging apparatus of the present invention is intended to be used.

Most preferably, the decoder package is located in the handle or elsewhere in the housing of the imaging camera assembly. The decoded signals are sent to a CPU/display device, such as the laptop or desktop computer mentioned above, where human readable information is produced.

The imaging camera of the present invention thus provides an operator with real-time images that can be decoded so that the encoded information contained in the symbol located on the component surface can be quickly and efficiently obtained.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of optically imaging information-containing symbols off a surface using a conventional optical touch camera, comprising the steps of:

positioning an imaging assembly of the touch camera atop an information containing coded symbol located on said surface, positioning a diffuser element between said coded symbol and said imaging assembly, moving said diffuser element into juxtaposition with said coded symbol, and imaging said coded element, wherein said diffuser element diffuses light from said imaging assembly prior to the light being reflected back to the imaging assembly, thereby eliminating "blooming".

2. The method of claim 1, wherein said step of moving said diffuser element into juxtaposition with said coded symbol comprises pressing said touch camera imaging assembly against said surface with said diffuser element captured therebetween.

3. The method of claim 1, wherein
said step of positioning said diffuser element between said coded symbol and said imaging assembly comprises first securing said diffuser element to said imaging assembly.

4. The method of claim 1, and further including the step of decoding said coded symbol.

5. The method of claim 2, and further including the step of decoding said coded symbol.

6. The method of claim 1, wherein said coded symbol comprises a bar code symbol.

7. The method of claim 1, wherein said coded symbol comprises a matrix coded symbol.

8. The method of claim 7, wherein said coded symbol comprises a Vericode® symbol.

9. Apparatus for optically imaging information-containing symbols off a surface using an optical touch camera, comprising:

a touch camera including an imaging assembly having a viewing window adapted to be disposed atop an information-containing symbol located on said surface, and a diffuser element positioned between said symbol and said imaging assembly for diffusing light from said touch camera prior to the light being reflected back to the camera, thereby eliminating "blooming".

10. The apparatus of claim 9, and further including means for supporting said diffuser element in juxtaposition with said symbol before said symbol is imaged.

11. The apparatus of claim 10, wherein said supporting means comprises means for securing said diffuser element to said imaging assembly.

12. Apparatus for optically enhancing the image of an information-containing symbol obtained from a surface using an optical touch camera of a type having illuminating lights, comprising:

an optical diffuser element adapted to be positioned between said surface and the lens of said touch camera for diffusing light from the illuminating lights prior to the light being reflected back to a lens of the touch camera, thereby eliminating "blooming".

13. The apparatus of claim 12, and further comprising means for attaching said diffuser element to the camera.

14. The apparatus of claim 12, wherein said diffuser element comprises a thin disc of plastic material.

15. The apparatus of claim 14, wherein said plastic material is a polyester plastic film.

16. The apparatus of claim 12, wherein said diffuser element is at least 0.002 inches thick.

17. A method for providing real-time images of information-encoded symbols located on an optically reflective surface so that the encoded information contained in the symbols can be quickly and efficiently obtained, said method comprising:

locating the optical imaging window of a touch CCD camera atop the symbol to be imaged, disposing a diffuser element between said window and said symbol, pressing said window of the camera against the diffuser element and into contact with the reflective surface, actuating the lens of said camera to instantaneously capture a single symbol image, and determining the information encoded in said imaged symbol wherein said diffuser element diffuses light from said camera prior to the light being reflected back to the camera, thereby eliminating "blooming".

18. The method of claim 17, wherein said step of determining the encoded information comprises:

converting said image to a train of digital signals, decoding said signal train via a decoder software package, and displaying said decoded signals in human-readable format on display means.

19. The method of claim 18, wherein said decoder software package is housed in the touch camera.

20. The method of claim 18, wherein said decoder software package is housed in computer processor means separate from said camera.

21. The method of claim 18, wherein said surface on which said encoded symbol is located is a curved surface.

* * * * *